United States Patent [19]

Ohnishi et al.

[11] Patent Number: 4,965,482
[45] Date of Patent: Oct. 23, 1990

[54] ULTRASONIC MOTOR AND METHOD OF ADJUSTING THE SAME

[75] Inventors: Osamu Ohnishi; Sadayuki Takahashi; Osamu Myohga; Tadao Uchikawa; Takeshi Inoue; Isao Kagaya; Sadayuki Ueha, all of Tokyo, Japan

[73] Assignee: NEC Corporation, Japan

[21] Appl. No.: 365,897

[22] Filed: Jun. 14, 1989

[30] Foreign Application Priority Data

Jun. 17, 1988 [JP] Japan .................. 63-149726
Jun. 29, 1988 [JP] Japan .................. 63-164033
Aug. 11, 1988 [JP] Japan .................. 63-201605
Feb. 28, 1989 [JP] Japan .................. 1-48860

[51] Int. Cl.$^5$ .......................................... H01L 41/08
[52] U.S. Cl. ..................... 310/323; 310/325; 310/333
[58] Field of Search ............... 310/321, 323, 325, 328, 310/312, 333

[56] References Cited

U.S. PATENT DOCUMENTS

| | | | |
|---|---|---|---|
| 4,642,509 | 2/1987 | Kumada | 310/328 X |
| 4,663,556 | 5/1987 | Kumada | 310/328 X |
| 4,764,702 | 8/1988 | Mishiro | 310/328 X |
| 4,812,697 | 3/1989 | Mishiro | 310/325 X |

FOREIGN PATENT DOCUMENTS 61-121777 6/1986 Japan .

OTHER PUBLICATIONS

A Piezoelectric Ultrasonic Motor Akio Kumada Proceedings of the International Meeting on Ferroelectricity, Kobe 1985, Japanese Journal of Applied Physics, vol. 24(1985), Supplement 24-2, pp. 739-741.
Longitudinal-Torsional Composite Transducer and Its Applications Sadayuki Ueha, Hideki Nagashima and Michiyuki Masuda Proceedings of the 6th Meeting on Ferroelectric Materials and Their Applications, Kyoto 1987, Japanese Journal of Applied Physics, vol. 26(1987), Supplement 26-2, pp. 188-190.

*Primary Examiner*—Mark O. Budd
*Attorney, Agent, or Firm*—Leydig, Voit & Mayer

[57] ABSTRACT

An ultrasonic motor has a longitudinal-torsional composite transducer, a stator constituted by an ultrasonic vibrator sandwiching the transducer, and a rotor urged against the stator. The stator excites longitudinal-torsional ultrasonic vibrations to rotate the rotor by a frictional force. The motor includes a vibration adjusting rod for matching resonance frequencies of longitudinal and torsional ultrasonic vibrations of the stator with each other.

17 Claims, 8 Drawing Sheets

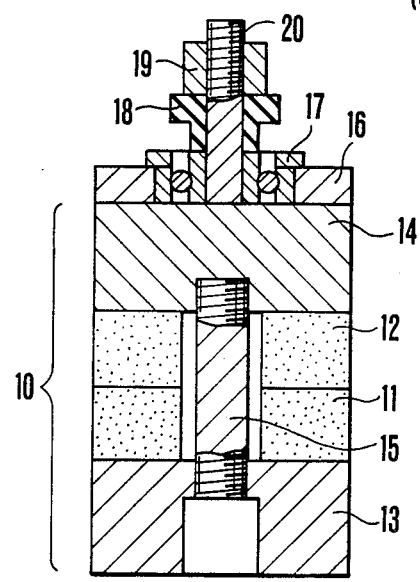
F I G. 2

ULTRASONIC MOTOR AND METHOD OF ADJUSTING THE SAME

BACKGROUND OF THE INVENTION

The present invention relates to an ultrasonic motor and a method of adjusting the same and, more particularly, to an ultrasonic motor for generating ultrasonic vibrations in a transducer as a stator so as to rotate a rotor urged against the stator by using a frictional force and a method of adjusting the same.

In a conventional ultrasonic motor of this type, a rotor is urged against an end face of a stator having a longitudinal-torsional composite transducer, and the rotor is rotated by a frictional force (Japanese Laid-Open No. 61-12177).

FIG. 1 is a sectional view showing a conventional ultrasonic motor. As shown in FIG. 1, in the conventional ultrasonic motor, a stator is integrally formed by sandwiching a torsional vibration exciting piezoelectric element 101 (arrows indicate polarization directions) and a longitudinal vibration exciting piezoelectric element 102 between columnar or cylindrical ultrasonic vibrators 103 and 104, and is clamped by a bolt 106. In addition, the ultrasonic motor has a rotor 105 urged against an end face of the stator. An elliptical motion is generated on the end face of the stator by independently applying voltages to the piezoelectric elements 101 and 102. The rotor 105 is rotated by utilizing this elliptical motion.

Referring to FIG. 1, reference numerals 107, 108, 109, and 110 denote terminal plates.

Since the ultrasonic speed of a torsional vibration wave is about 60% of that of a longitudinal vibration wave, it is difficult to match the resonance frequency of torsional vibrations with that of longitudinal vibrations in the stator having the above-described arrangement. Therefore, in the above stator, if the stator is resonated and driven to generate torsional vibrations, longitudinal vibrations are generated by nonresonant driving. On the contrary, if longitudinal vibrations are generated by resonant driving, torsional vibrations are generated by nonresonant driving.

As is known, in comparison with resonant driving, an amplitude obtained by nonresonant driving becomes very small if the power remains the same. As a result, the vibration amplitude in either the longitudinal or torsional direction of the elliptical motion generated on the end face of the stator becomes small, and hence a high-efficiency ultrasonic motor is difficult to realize.

In addition, in the stator having the above-described arrangement, two types of vibrations can be generated by resonant driving by applying AC voltages having different frequencies to the torsional vibration exciting piezoelectric element and the longitudinal vibration exciting piezoelectric element. In this case, however, since resonance frequencies are different from each other, an elliptical motion cannot be regularly generated on the end face of the stator, and the rotor cannot be stably rotated.

SUMMARY OF THE INVENTION

It is an object of the present invention to provide an ultrasonic motor capable of efficiently and stably rotating a rotor and a method of adjusting the same.

In order to achieve the above object, according to an aspect of the present invention, there is provided an ultrasonic motor comprising a longitudinal-torsional composite transducer, a stator including an ultrasonic vibrator sandwiching the transducer, a rotor urged against the stator, for causing the stator to excite longitudinal-torsional ultrasonic vibrations and for rotating the rotor by a frictional force, and adjusting means for matching resonance frequencies of longitudinal and torsional ultrasonic vibrations of the stator with each other adjusting means for adjusting the pressure or urging said rotor against said stator.

BRIEF DESCRIPTION OF THE DRAWINGS

FIG. 2 is a sectional view showing an ultrasonic motor according to a first embodiment of the present invention;

DETAILED DESCRIPTION OF THE PREFERRED EMBODIMENTS

Figure 1:
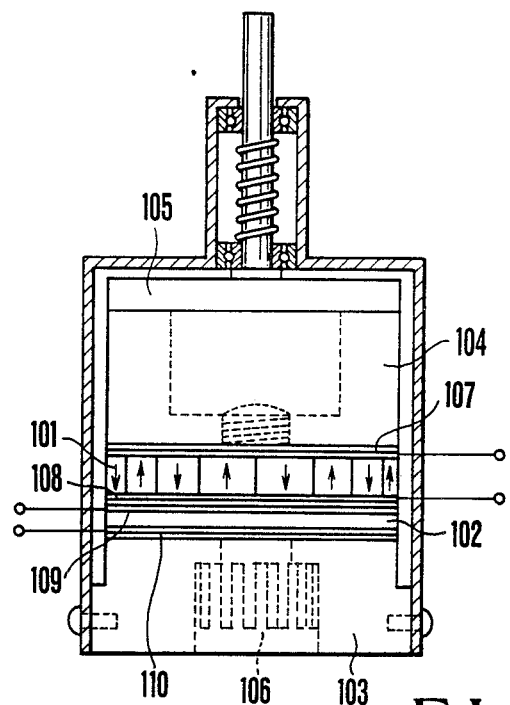
FIG. 1 a sectional view showing a conventional ultrasonic motor.

FIG. 2 shows an ultrasonic motor according to a first embodiment of the present invention. Referring to FIG. 2, in this ultrasonic motor, a stator 10 is integrally formed by sandwiching a torsional vibration exciting piezoelectric element 11 and a longitudinal vibration exciting piezoelectric element 12 between two ultrasonic vibrators 13 and 14 constituted by columnar or cylindrical metal members, and is firmly clamped by a bolt 15. A rotor 16 is urged against the vibrator 14 of the stator 10 by using a bearing 17, a resin elastic member (e.g., a coil spring) 18, a nut 19, and a bolt 20.

The torsional vibration exciting piezoelectric element 11 is prepared by stacking eight ceramic plates each of which has an outer diameter of 20 mm, an inner diameter of 10 mm, and a thickness of 0.5 mm and is polarized in its circumferential direction. The upper and lower surfaces of each ceramic plate are metallized. The respective ceramic plates are stacked on each other through thin metal plates so as to have opposite polarities. In addition, the thin metal plates are electrically connected in parallel with each other outside the structure.

The longitudinal vibration exciting piezoelectric element 12 is prepared by stacking 12 piezoelectric ceramic plates each of which is polarized in the direction of thickness. The size and arrangement of the element 12 are the same as those of the element 11.

Note that the ultrasonic vibrators 13 and 14, the bolt 15, the rotor 16, the nut 19, and the bolt 20 are made of stainless steel, and that the total length of the ultrasonic motor is about 60 mm.

In this arrangement, the longitudinal vibration half-wave resonance frequency of the stator 10 is about 1.6 times its torsional vibration half-wave resonance frequency. In this case, if the clamping pressure of the metal rotor 16 on the end face of the stator 10 is adjusted by using the bearing 17, the resin elastic member 18, the nut 19, and the bolt 20, the torsional vibration half-wave resonance frequency substantially solely determined by the stator 10 can be caused to coincide with the longitudinal vibration half-wave resonance frequency (much lower than the frequency determined solely by the stator 10) determined by the overall arrangement of the motor. As a result, in the ultrasonic motor having the above-described arrangement, if AC voltages are independently applied to the piezoelectric elements 11 and 12, and a phase difference of 90° is provided to the two AC voltages, the rotor 16 can be rotated with high efficiency.

Figure 3:
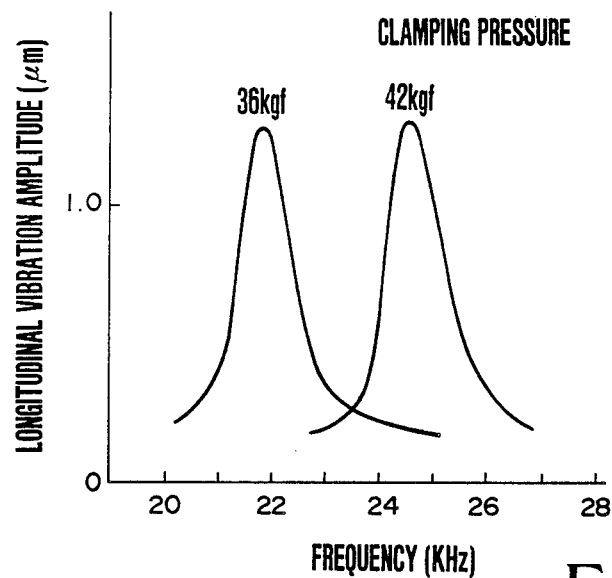
FIG. 3 is a graph showing a relationship between longitudinal vibration amplitudes and frequencies in the first embodiment.

FIG. 3 shows measurement values of longitudinal vibration amplitudes at an interface between the rotor 16 and the stator 10 of the ultrasonic motor of the embodiment. In this case, a voltage to be applied to the motor is set to be 100 V.

As is apparent from FIG. 3, if the clamping pressure of the rotor 16 on the stator 10 is changed, a frequency at which a maximum amplitude is obtained, i.e., the resonance frequency of longitudinal vibrations is changed. In this embodiment, when the clamping pressure is set to 42 kgf, the resonance frequency of longitudinal vibrations becomes 24.5 kHz. As a result, the resonance frequencies of torsional and longitudinal vibrations accurately coincide with each other.

Note that the torsional vibration half-wave resonance frequency of the stator 10 is about 24 kHz, and a change therein due to a clamping pressure is negligibly small.

Figure 4:
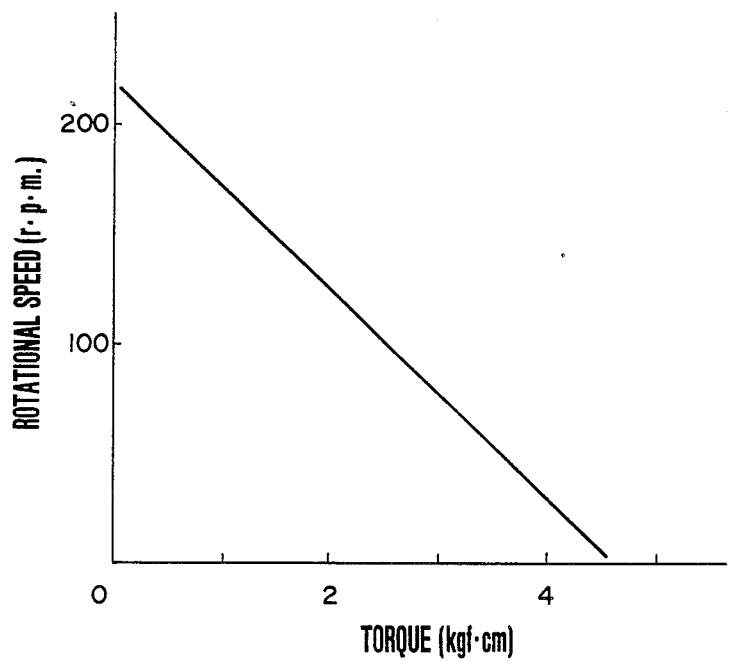
FIG. 4 is a graph showing a relationship between rotational speeds and torques in the first embodiment.

FIG. 4 shows the characteristics of the ultrasonic motor of the invention. As is apparent from FIG. 4, if sine waves which are 90° out of phase and each of which has a frequency of 24.5 kHz and a voltage of 100 V are respectively applied to the torsional and longitudinal vibration exciting piezoelectric elements 11 and 12 of the ultrasonic motor, the motor exhibits a high performance, i.e., an idling speed of 220 rpm and a maximum torque of 4.6 kgf·cm, which cannot be obtained by a conventional ultrasonic motor.

As described above, according to the first embodiment of the present invention, longitudinal vibrations whose resonance frequency is determined by the overall arrangement of an ultrasonic motor and a torsional vibration half-wave resonance substantially determined by a stator are utilized, and only the longitudinal vibration resonance frequency is adjusted by a clamping pressure of the rotor and the stator. Therefore, the two resonance frequencies can be easily matched with each other, and a highly efficient and practical ultrasonic motor can be realized.

Figure 5:
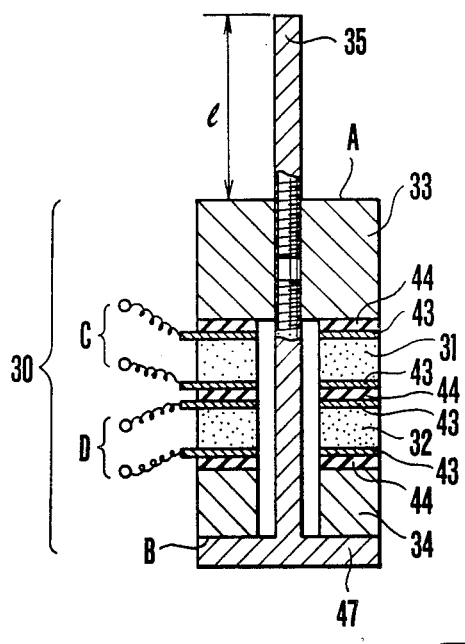
FIG. 5 is a sectional view showing a stator of an ultrasonic motor according to a second embodiment of the present invention.

FIG. 5 is a sectional view showing a stator of an ultrasonic motor according to a second embodiment of the present invention.

Referring to FIG. 5, reference numeral 31 denotes a longitudinal vibration exciting piezoelectric element; 32, a torsional vibration exciting piezoelectric element; 33 and 34, columnar ultrasonic vibrators; and 35, a vibration adjusting rod mounted in a central portion of the vibrator 33. Note that reference numeral 30 denotes a stator.

In this case, the longitudinal vibration exciting piezoelectric element 31 is formed into a ring-like shape having a diameter of 20 mm and a thickness of 4 mm, and is polarized in the direction of thickness. The torsional vibration exciting piezoelectric element 32 has the same size as that of the piezoelectric element 31 and is polarized in the circumferential direction. The pair of piezoelectric elements 31 and 32 are sandwiched between the metal ultrasonic vibrators 33 and 34 through electrode plates 43 and insulating plates 44 and are clamped by a T type bolt 47 to be integrally formed. The vibration adjusting rod 35 constituted by a metal shaft having a diameter of 4 mm is screwed into the central portion of the vibrator 33 to be fixed therein. The length of the rod 35 from its distal end to the bottom of the bolt 47 is 80 mm. When an AC voltage is applied to an electrode terminal C of the ultrasonic motor, longitudinal resonance is excited in the stator 30. When an AC voltage is applied to an electrode terminal D, torsional resonance is excited.

In the stator 30 shown in FIG. 5, if AC voltages which are 90° out of phase and have the same frequency are respectively applied to the piezoelectric elements 31 and 32, the stator becomes a longitudinal-torsional composite piezoelectric resonator, and hence an elliptical motion with large longitudinal and lateral amplitudes is generated on end faces A and B of the vibrators 33 and 34. Therefore, if a rotor is urged against the end face A or B, the rotor can be rotated with high efficiency.

That is, the arrangement of the embodiment is characterized in that the vibration adjusting rod 35 is arranged in the central portion of the ultrasonic vibrator 33. If the rod 35 is not used, the longitudinal vibration resonance frequency of the stator 30 becomes about 1.6 times the torsional vibration resonance frequency, and the two resonance frequencies do not coincide with each other. If the rod 35 is used, only the resonance frequency of longitudinal vibrations can be greatly decreased while the resonance frequency of torsional vibrations is kept substantially constant. Therefore, by changing the length of the rod 35, the two resonance frequencies can be matched with each other.

Figure 6:
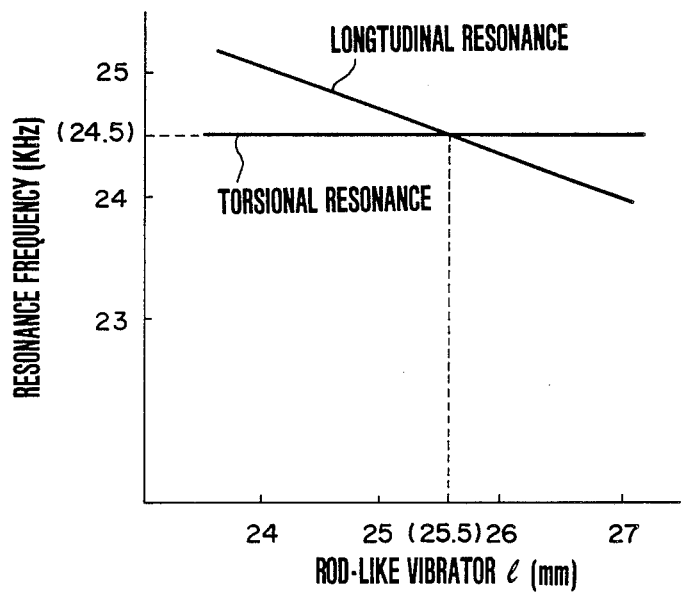
FIG. 6 is a graph showing a relationship between resonance frequencies and projection lengths in the second embodiment.

FIG. 6 shows resonance frequencies obtained when the stator 30 described above is driven. As is apparent from FIG. 6, if a length ( of the vibration adjusting rod 35 shown in FIG. 5 is changed, only the resonance frequency of longitudinal vibrations can be greatly decreased while the resonance frequency of torsional vibrations is kept substantially constant. In this embodiment, when e =25.5 mm, the torsional and longitudinal resonance frequencies become 24.5 kHz, and accurately coincide with each other.

Figure 7:
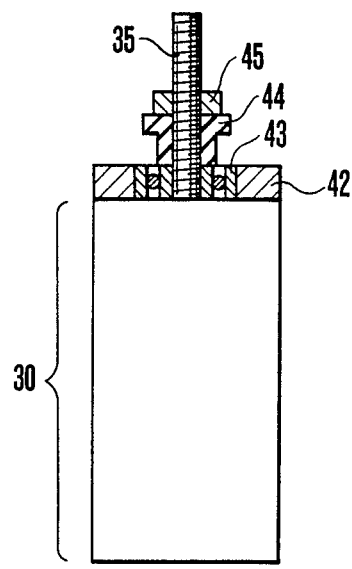
FIG. 7 is a view showing a detailed arrangement of the ultrasonic motor of the second embodiment.

FIG. 7 is a sectional view showing an arrangement of the ultrasonic motor according to the second embodiment.

A stator 30 in FIG. 7 has the same arrangement (not shown) as that of the stator in FIG. 5, and a rotor 42 is arranged on the stator 30. The rotor 42 is urged against an end face of the stator 30 by a nut 45 through a bearing 43 and an elastic member (e.g., a spring) 44.

In this state, when AC voltages are independently applied to longitudinal and torsional vibration exciting piezoelectric elements 31 and 32 of the ultrasonic motor, the rotor is rotated at a phase difference 90° between the AC voltages. If, for example, 100 V AC voltages are applied to the ultrasonic motor, motor characteristics of an idling speed of 310 rpm, a starting torque of 5.3 kgf·cm, and an efficiency of 45% can be obtained.

As described above, according to the second embodiment of the present invention, since torsional-longitudinal vibrations can be excited in a composite vibrator at the same frequency by adjusting a vibration adjusting rod, a high-output, high-efficiency ultrasonic motor can be realized.

In the second embodiment, half-wave resonance is exemplified. However, elliptical vibrations can be generated by matching higher-order resonance frequencies of longitudinal vibrations but not of primary vibrations by changing the diameter and length of a vibration adjusting rod. In addition, the vibration adjusting rod 35 and the rotor 42 may be respectively arranged on different end faces of the stator 30.

Figure 8:
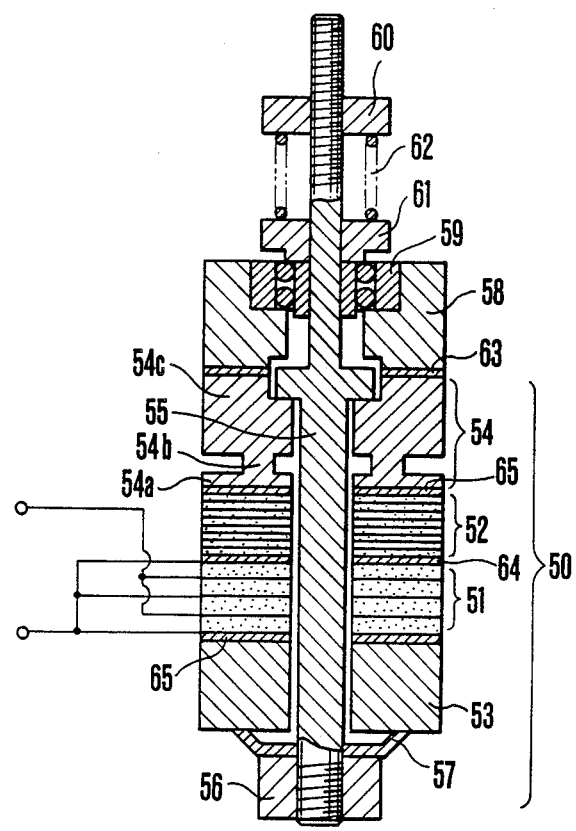
FIG. 8 is a sectional view showing an ultrasonic motor according to a third embodiment of the present invention.
Figure 10:
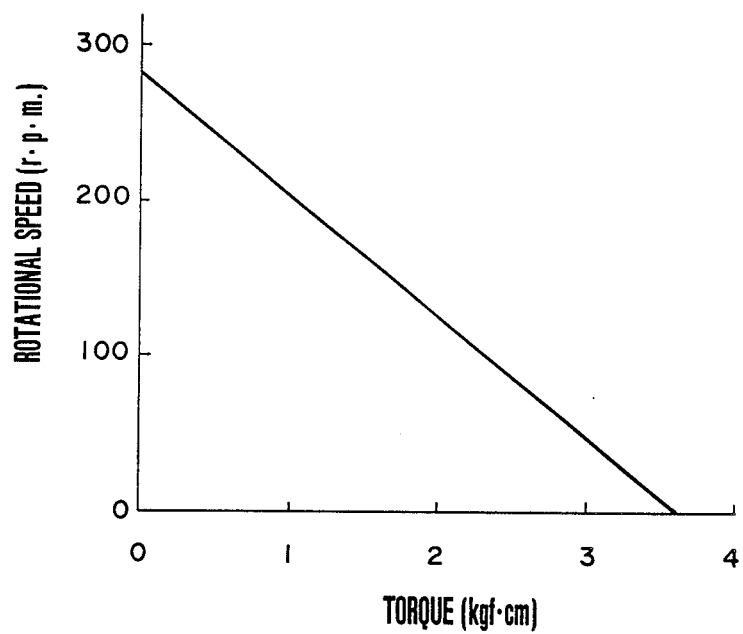
FIG. 10 is a graph showing a relationship between rotational speeds and torques in the third embodiment.

FIG. 8 is a sectional view showing an ultrasonic motor according to a third embodiment of the present invention.

Referring to FIG. 8, in the ultrasonic motor, a stator 50 is integrally formed by sandwiching torsional and longitudinal vibration exciting piezoelectric elements 51 and 52 between two ultrasonic vibrators 53 and 54, and are firmly clamped by a bolt 55 and a nut 56. Reference numeral 57 denotes a Belleville spring for minimizing changes in pressure applied by a bolt/nut compressive stress applying means with changes in temperature due to a difference in thermal expansion coefficient between the respective components; and 58, a rotor. A bearing 59 is fitted in the rotor 58 so that the rotor 58 is smoothly rotated by elliptical vibrations generated on a stator surface abutting against the rotor 58. An ultrasonic vibrator 54 abutting against the rotor 58 has a coupling member 54b concentrically formed therewith. The vibrator 54 is divided into upper and lower portions 54c and 54a through the coupling member 54b defining a notched portion.

In this case, the torsional vibration exciting piezoelectric element 51 is constituted by four stacked piezoelectric ceramic plates each having an outer diameter of 20 mm, an inner diameter of 8 mm, and a thickness of 1.0 mm and polarized in the circumferential direction. The upper and lower surfaces of each ceramic plate are metallized. The ceramic plates are stacked on each other through thin metal plates so as to have opposite polarities. The thin metal plates are electrically connected in parallel with each other outside the structure.

The longitudinal vibration piezoelectric element 52 is formed by stacking 12 piezoelectric ceramic plates (an outer diameter of 20 mm, an inner diameter of 8 mm, and a thickness of 0.5 mm) on each other, each of which is polarized in the direction of thickness. The piezoelectric element 52 has the same arrangement as that of the piezoelectric element 51.

The ultrasonic vibrators 53 and 54, the rotor 58, and a seat 61 are made of stainless steel. The bolt 55 and the nuts 56 and 60 on which a large static or dynamic stress acts are made of high tensile steel. The rotor 58 is urged against the metal block 54c by using the bearing 59, the seat 61, a coil spring 62, the bolt 55, and the nut 60.

Reference numerals 64 and 65 denote $Al_2O_3$ insulating plates each having a thickness of 0.4 mm, which are inserted to allow the piezoelectric elements 51 and 52 to be independently driven; and 63, a wear resistant member made of an organic material.

As described above, according to the conventional stator constituted by a torsional-longitudinal composite transducer, since the resonance frequencies of longitudinal and torsional vibrations are greatly different from each other, when resonant driving is performed by torsional vibrations, longitudinal vibrations are set in a nonresonant state. For this reason, it is difficult to transmit a large longitudinal amplitude (axial amplitude) to a rotor. In contrast to this, in the ultrasonic motor of the embodiment, an axial displacement having a large amplitude can be transmitted to a rotor by using an axial displacement enlarging mechanism constituted by a coupling member, an ultrasonic vibrator, and a bolt.

Figure 9:
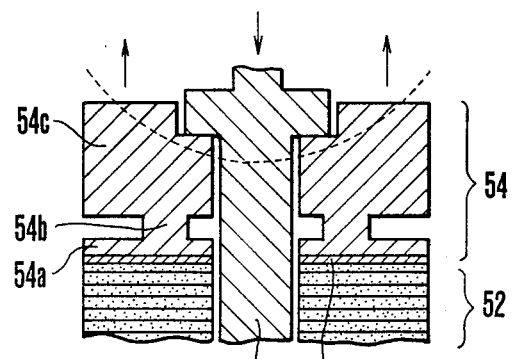
FIG. 9 is a sectional view showing an axial displacement enlarging mechanism in the third embodiment.

FIG. 9 is a sectional view of part of a stator of an ultrasonic motor of the third embodiment, showing the longitudinal vibration exciting piezoelectric element 52, the ultrasonic vibrator 54c, the coupling member 54b, and the bolt 55 which are associated with the axial displacement enlarging mechanism.

In the ultrasonic motor, the bolt 55 is forcibly expanded upon expansion of the piezoelectric element 52. In addition, the ultrasonic vibrator 54c tends to be raised through the ultrasonic vibrator 54a and the coupling member 54b. At this time, a force for restoring the bolt 55 to the original position is generated. A shearing force indicated by arrows in FIG. 9 acts in the vibrator 54c, and the coupling member 54b is slightly bent and displaced.

That is, an enlarged displacement indicated by a dotted line in FIG. 9 is generated with a portion of the coupling member 54b acting as a fulcrum. An end face of the ultrasonic vibrator 54c is an end face of the stator 50 at the same time. The axial displacements based on longitudinal vibrations are superposed in phase on the end face of the stator 50, especially its outer peripheral portion, thereby generating the above displacement. Therefore, a displacement several times larger than that in the ultrasonic motor having the conventional longitudinal-torsional composite transducer as a stator can be generated on the stator surface.

The resonance frequency of flex vibrations indicated by the dotted line in FIG. 9 generated by the constituent elements, i.e., the bolt 55, the longitudinal vibration piezoelectric element 52, the coupling member 54b, and the ultrasonic vibrators 54a and 54c is determined by the size and elasticity constant of each member. The ultrasonic motor of this embodiment is advantageous in that the resonance frequency of flex vibrations can be matched with the torsional resonance frequency of the overall stator.

That is, the stator 50 according to the third embodiment can be driven while the torsional vibration resonance frequency is matched with the resonance frequency of the axial vibrations obtained by mixing the longitudinal vibrations and the flex vibrations of the ultrasonic vibrator 54. Therefore, a large axial displacement can be easily provided to the rotor 58, and the rotor can be rotated with high efficiency.

In order to match the half-wave resonance frequency of torsional vibrations of the ultrasonic motor with the resonance frequency of axial vibrations according to the third embodiment, experiments were conducted by changing the height of the vibrator 54c from 10 to 15 mm while the urging force between the stator and the rotor was constantly set to be 45 kgf and the height of the vibrator 54a was constantly set to be 3 mm. As a result, when the height of the vibrator 54c was 13.5 mm, the two resonance frequencies coincided with each other. In this case, the resonance frequency was 24.2 kHz.

When sine waves which are 90° out of phase and each of which has a frequency of 24.2 kHz and a voltage of 120 V are respectively applied to the torsional and longitudinal vibration exciting piezoelectric elements, a high performance, i.e., an idling speed of 280 rpm and a maximum torque of 3.6 kgf·cm which could not be obtained in a conventional ultrasonic motor was realized. A rise in temperature in conventional ultrasonic motors has been mainly caused by frictional heat. In contrast to this, even if the ultrasonic motor of this embodiment is continuously driven for one hour, a rise in temperature from a room temperature can be limited to 30° C. or lower. That is, in the ultrasonic motor of the embodiment, since axial vibrations can be amplified, sliding between the stator and rotor can be greatly reduced, and low-heat generation can be realized. Note that the axial vibration displacement of the outer peripheral portion of the stator end face at the resonance frequency reached 7 μm.

The resonance frequency of the composite vibrations having longitudinal and flex displacement components parallel to the axial direction is changed with changes in deflection stiffness of the coupling member 54b. The deflection stiffness is a function of the height and width of the coupling member 54b. That is, by reducing the width of the coupling member 54b by cutting it from its outer peripheral portion by a mechanical process, frequency adjustment can be performed even after the ultrasonic motor is assembled.

As described above, according to the third embodiment of the present invention, the resonance frequency of torsional vibrations can be matched with that of the composite vibrations having an axial vibration displacement generated by longitudinal and flex vibrations. Therefore, a highly efficient and practical ultrasonic motor can be realized.

Figure 11:
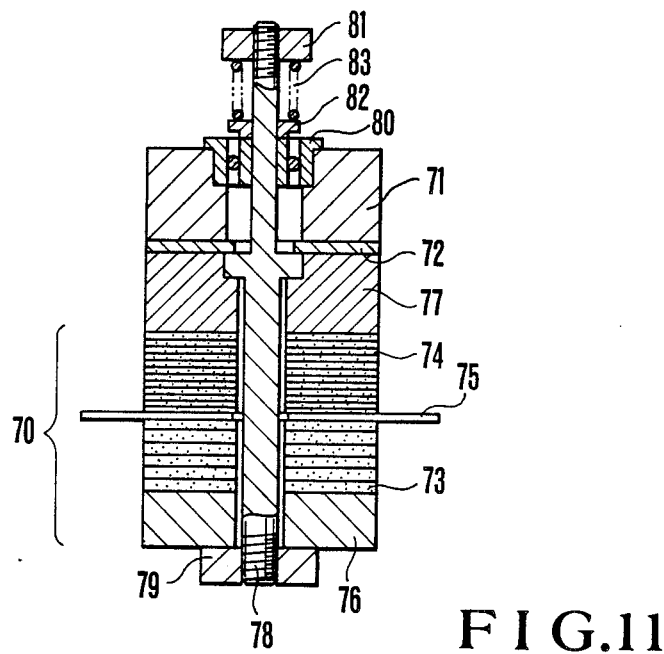
FIG. 11 is a sectional view showing an ultrasonic motor according to a fourth embodiment of the present invention.

FIG. 11 is a sectional view showing an ultrasonic motor according to a fourth embodiment of the present invention. As shown in FIG. 11, the ultrasonic motor of this embodiment comprises a sliding member 72 inserted between a stator 70 and a rotor 71. The stator 70 is designed such that a stationary plate 75 is sandwiched between torsional and longitudinal vibration exciting piezoelectric elements 73 and 74, the elements 73 and 74 are sandwiched between ultrasonic vibrators 76 and 77, and the resultant structure is firmly clamped by a bolt 78 and a nut 79. The torsional vibration exciting piezoelectric element 73 is formed by stacking ceramic plates on each other, each of which has an outer diameter of 20 mm, an inner diameter of 8 mm, and a thickness of 0.5 mm and is polarized in the circumferential direction.

The longitudinal vibration exciting piezoelectric element 74 is formed by stacking ceramic plates (outer diameter: 20 mm, inner diameter: 8 mm, thickness: 0.5 mm) on each other, each of which is polarized in the direction of thickness. The rotor 71 is arranged to oppose the stator 70. A bearing 80 is then inserted in the rotor 71, and the rotor 71 is fitted on the bolt 78 to be urged against the stator 70 by using a press nut 81, a spacer 82, and a spring 83. In addition, the sliding member 72 made of a polyester compound is inserted between the stator 70 and the rotor 71. The sliding member 72 is an engineering plastic obtained by mixing a polyester resin with Teflon. For example, "ekonol-S" (trade name of SUMITOMO CHEMICAL CO., LTD.) is used as a material for the sliding member 72. In such an arrangement, when AC voltages are respectively applied to the piezoelectric elements 74 and 73, longitudinal and torsional vibrations are excited.

If the stator constituting the ultrasonic motor as described above is considered as a single body, the resonance frequency of torsional vibrations is different from that of longitudinal vibrations. If, however, the rotor is urged against the stator through a sliding member constituted by a composite material, e.g., a plastic material, the torsional vibrations of the overall motor constituted by the stator, the sliding member, and the rotor have a weak mechanical restricting force in the torsional direction (rotating direction), and changes in resonance frequency are small. However, since a rotor mass acts on the stator due to the urging force, the resonance frequency in the longitudinal direction (the axial direction of the urging force) changes. Therefore, changes in resonance frequency are influenced by the rigidity of a sliding member as a coupling member inserted between the stator and the rotor.

As is known, if the Young's modulus, thickness, and sectional area of a material are respectively represented by E, L, and A, the rigidity of the material is represented by EA/L. If the Young's modulus E is constant, the rigidity is increased as the thickness L of the sliding member is reduced by an urging force. In addition, since the composite material is of a nonlinear type whose Young's modulus E itself is increased upon compression thereof, the rigidity is increased.

If the urging force between the rotor and the stator is constant, as the Young's modulus is increased, the rigidity is increased. Since the coupling force between the stator and the rotor is increased by changing the rigidity, the resonance frequency can be changed to allow the longitudinal and torsional resonance frequencies to coincide with each other.

Similar to changes in resonance frequency, a vibration mode representing a change distribution of vibrations is changed in accordance with a rotor urging force and the rigidity of a sliding member, and hence the vibration mode can be also adjusted. Therefore, a mode for obtaining a maximum vibration amplitude near a sliding member can be formed by the above-described adjustment, and the rotating force of an elliptical motion for driving the rotor can be increased.

Figure 12:
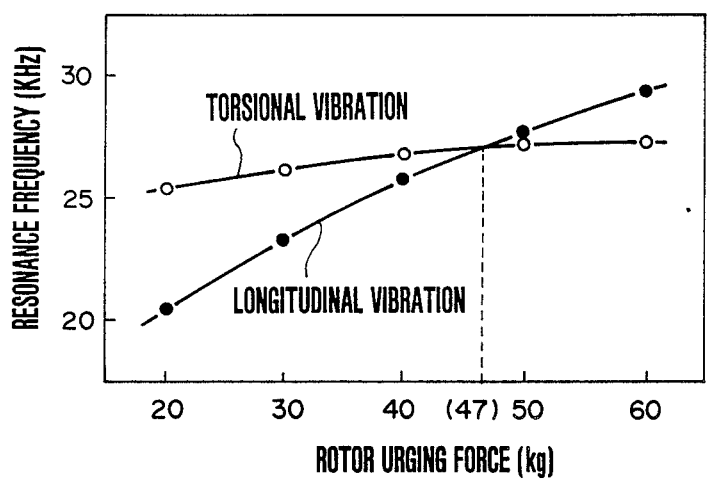
FIG. 12 is a graph showing a relationship between rotor urging forces and resonance frequencies in the longitudinal and torsional directions in the fourth embodiment.

FIG. 12 shows measurement values for establishing a relationship between rotor urging forces and longitudinal and torsional resonance frequencies of the ultrasonic motor of the above embodiment. In this case, a voltage to be applied to the ultrasonic motor is set to be 100 V. As is apparent from the graph in FIG. 12, if the urging force between the rotor 71 and the stator 70 is changed, the longitudinal and torsional resonance frequencies are changed. In this embodiment, when the urging force was 47 kgf, the longitudinal and torsional resonance frequencies coincided with each other.

Figure 13:
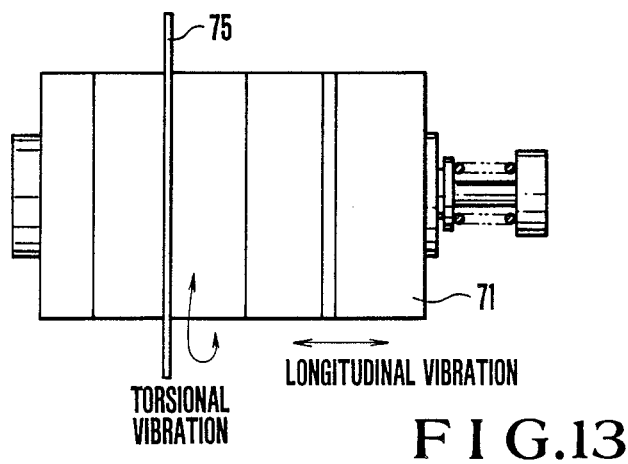
FIG. 13 is a view showing an arrangement of the ultrasonic motor of the fourth embodiment.
Figure 14A:
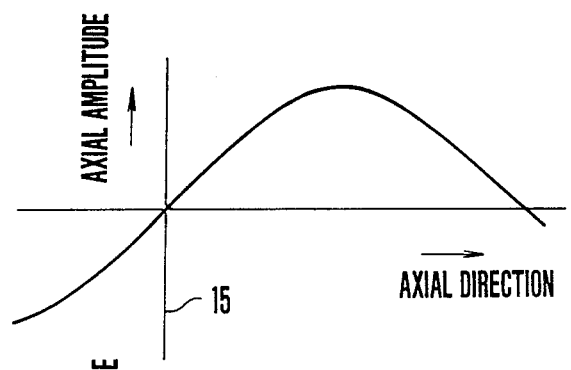
FIGS. 14(a) and 14(b) are graphs respectively showing vibration modes in the fourth embodiment.
Figure 14B:
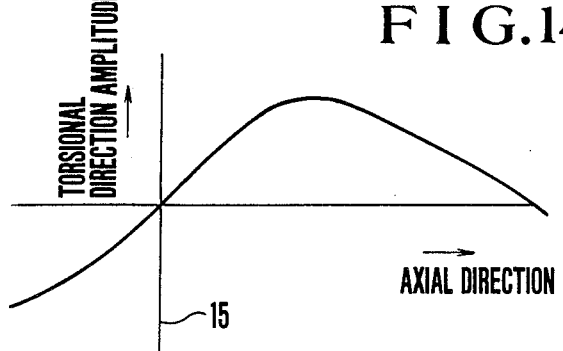

FIG. 13 shows an arrangement of the ultrasonic motor of this embodiment. FIGS. 14(a) and 14(b) respectively show vibration modes in the longitudinal (axial) direction and the torsional (circumferential) direction of the ultrasonic motor.

As is apparent from the above-described characteristics, in each mode, the stationary plate 75 serves as a stationary point (node), and a large amplitude appears at the rotor sliding surface. As a result, the stationary plate can be supported, and at the same time, longitudinal and torsional vibrations are mixed together to provide a large elliptical motion at the rotor sliding portion, thereby rotating the rotor with a high output. In this ultrasonic motor, when sine waves which are 90° out of phase and each of which has a frequency of 25 kHz and a voltage of 100 V are respectively applied to the torsional and longitudinal vibration piezoelectric elements, an idling speed of 280 rpm and a maximum torque 3 kgf·cm can be obtained, thereby realizing excellent characteristics.

Rotational operations were confirmed in a wide range of the rotor urging force from 30 to 60 kgf. In addition, the rotor can be reversely rotated by reversing voltage phase differences between the torsional and longitudinal transducers.

Figure 15:
FIGS. 15 and 16 are sectional views showing sliding members constituting the ultrasonic motor of the fourth embodiment.
Figure 16:

FIGS. 15 and 16 are sectional views respectively showing sliding members constituting the ultrasonic motor of the embodiment. As shown in FIGS. 15 and 16, sliding members 85 and 86 are composite members obtained by arranging, e.g., a glass or carbon fiber material in, e.g., a nylon or vinyl material and are formed into chips. Similar to the previous embodiment, the resonance frequencies can be matched with each other. In this embodiment, the resonance frequencies can be matched with each other by adjusting the rigidity and urging force of the sliding member based on its quality and shape.

As described above, according to the fourth embodiment of the present invention, resonance of longitudinal vibrations whose resonance frequency is determined by the overall arrangement of the ultrasonic motor and resonance of torsional vibrations are utilized. In addition, since the two resonance frequencies can be easily matched with each other by changing the rigidity of a sliding member inserted between the rotor and the stator, a highly efficient ultrasonic motor having a high torque can be realized.

What is claimed is:

1. An ultrasonic motor comprising:
   a longitudinal-torsional composite transducer;
   a stator including an ultrasonic vibrator sandwiching said transducer;
   a rotor urged against said stator for causing said stator to excite longitudinal-torsional ultrasonic vibrations and for rotating said rotor by a frictional force; and
   adjusting means for matching resonance frequencies of longitudinal and torsional ultrasonic vibrations of said stator with each other;
   wherein said adjusting means comprises pressure adjusting means for adjusting the pressure of urging said rotor against said stator.

2. A motor according to claim 1, wherein said adjusting means comprises:
   a shaft having one end fixed to said ultrasonic vibrator, said shaft rotatably extending through said rotor, and
   clamping means, attached to the other end of said shaft, for adjusting a pressure of urging said rotor against said stator.

3. A motor according to claim 1, wherein said adjusting means comprises:
   a shaft having a first end fixed to said ultrasonic vibrator, said shaft rotatably extending through said rotor;
   clamping means, attached to a second end of said shaft, for adjusting the pressure of urging said rotor against said stator; and
   a coil spring arranged between said rotor and said clamping means.

4. A motor according to claim 1, wherein said adjusting means further comprises vibration adjusting means for adjusting a frequency arranged in said stator.

5. A motor according to claim 4 wherein said vibration adjusting means comprises a vibration adjusting rod having a first end fixed to said ultrasonic vibrator and a second end, the length of the second end of said vibration adjusting rod being adjustable.

6. A motor according to claim 1 wherein said adjusting means further comprises a plate member inserted between said rotor and said stator for adjusting a frequency.

7. A motor according to claim 6 wherein said plate member comprises a resin member made of a mixture of polyester resin and Teflon.

8. A motor according to claim 6 wherein said plate member comprises a resin member made of a mixture of a glass fiber material and a nylon material.

9. A motor according to claim 6 wherein said plate member comprises a resin member made of a mixture of a carbon fiber material and a nylon material.

10. A motor according to claim 6 wherein said plate member comprises a resin member made of a mixture of a glass fiber material and a vinyl material.

11. A motor according to claim 6 wherein said plate member comprises a resin member made of a mixture of a carbon fiber material and a vinyl material.

12. A motor according to claim 1 wherein said adjusting means further comprises vibration adjusting means for matching a resonance frequency of axial vibrations as composite vibrations of longitudinal ultrasonic vibrations of said stator and flex vibrations of said ultrasonic vibrator with that of torsional ultrasonic vibrations.

13. A motor according to claim 12 wherein said vibration adjusting means has a structure in which a notched portion concentric with a rotational axis of said rotor is formed in a side surface of said ultrasonic vibrator sandwiched between said rotor and said longitudinal-torsional composite transducer.

14. A method of adjusting an ultrasonic motor having a longitudinal-torsional composite transducer, a stator including an ultrasonic vibrator sandwiching the transducer, and a rotor urged against the stator for causing the stator to excite longitudinal-torsional ultrasonic vibrations and rotating the rotor by a frictional force comprising:
    matching resonance frequencies of longitudinal and torsional ultrasonic vibrations of said stator with each other by arranging pressure adjusting means for adjusting a pressure for urging the rotor against the stator and matching the resonance frequencies of longitudinal and torsional ultrasonic vibrations by adjusting the pressure adjusting means.

15. A method according to claim 14 further comprising the step of arranging a vibration adjusting rod for adjusting a frequency in the stator, and the step of matching the resonance frequencies of longitudinal and torsional ultrasonic vibrations by adjusting a length of the vibration adjusting rod.

16. A method of adjusting an ultrasonic motor having a longitudinal-torsional composite transducer, a stator including an ultrasonic vibrator sandwiching the transducer, and a rotor urged against the stator for causing the stator to excite longitudinal-torsional ultrasonic vibrations and rotating the rotor by a frictional force comprising:

matching resonance frequencies of longitudinal and torsional ultrasonic vibrations of said stator with each other;

inserting a plate member for adjusting a frequency between the stator and the rotor; and matching the resonance frequencies of longitudinal and torsional ultrasonic vibrations by changing rigidity of the plate member.

17. A method according to claim 18 further comprising:

arranging vibration adjusting means for matching a resonance frequency of axial vibrations as composite vibrations of longitudinal ultrasonic vibrations of the stator and flex vibrations of the ultrasonic vibrator with that of torsional ultrasonic vibrations, and matching the resonance frequency of axial vibrations as composite vibrations of longitudinal ultrasonic vibrations of the stator and flex vibrations of the ultrasonic vibrator with that of torsional ultrasonic vibrations by adjusting a notched portion of the vibration adjusting means.

* * * * *

UNITED STATES PATENT AND TRADEMARK OFFICE
CERTIFICATE OF CORRECTION

PATENT NO. : 4,965,482

DATED : October 23, 1990

INVENTOR(S) : Ohnishi et al.

It is certified that error appears in the above-identified patent and that said Letters Patent is hereby corrected as shown below:

Column 12, line 6, change "18" to --16--.

Signed and Sealed this

Twenty-eighth Day of April, 1992

*Attest:*

HARRY F. MANBECK, JR.

*Attesting Officer*      *Commissioner of Patents and Trademarks*